Figure 1:
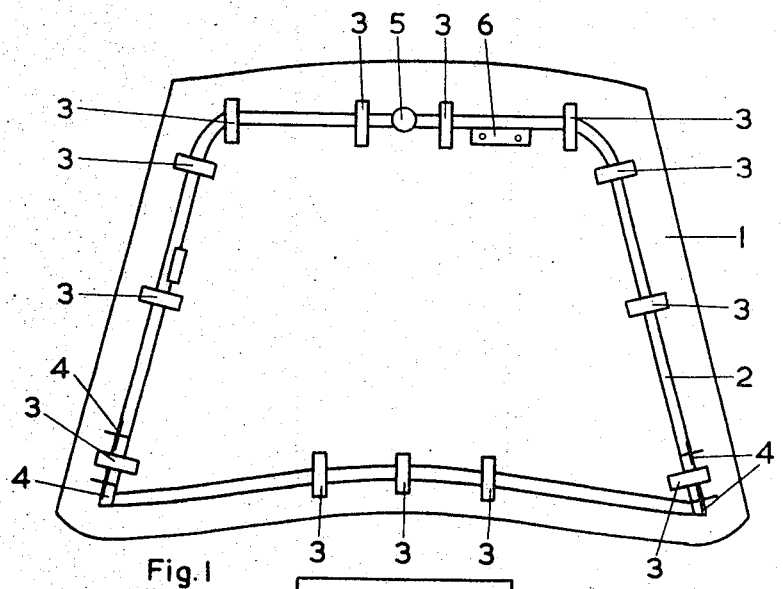
Figure 3:
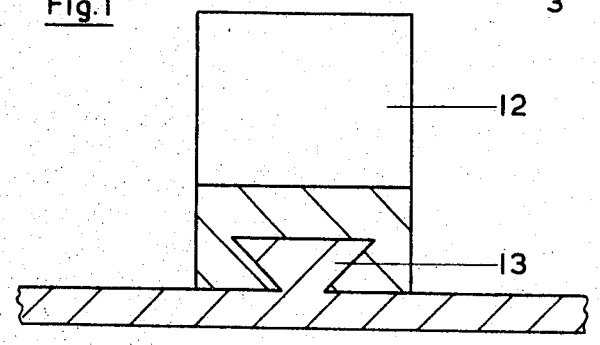
Figure 4:
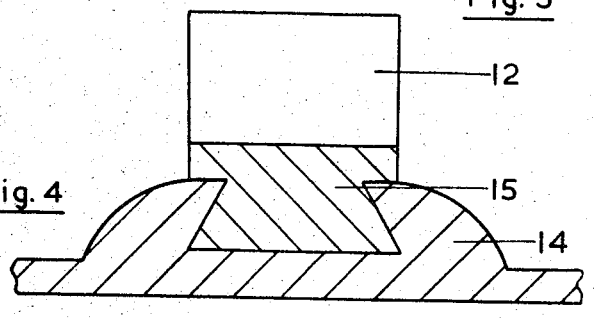
Figure 2:
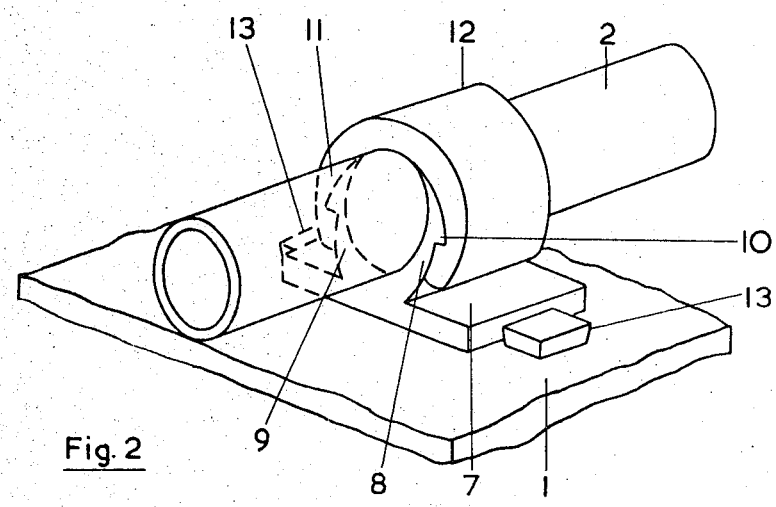
Figure 5:
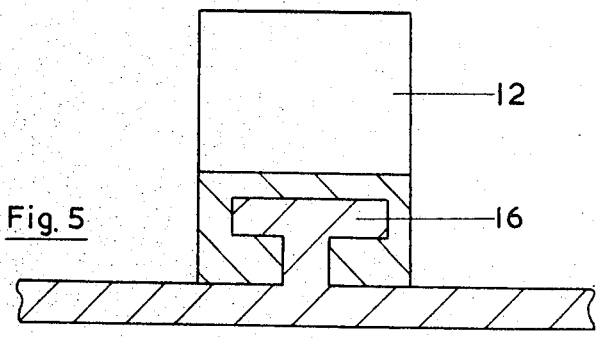
Figure 6:
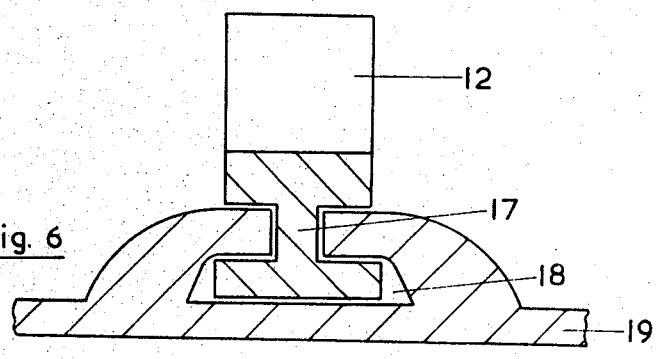

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

Published March 16, 1971

884 O.G. 732

T884,011

CLIPS

Paul Johnson Garner, Welwyn Garden City, England, assignor to Imperial Chemical Industries Limited, London, England

Filed Jan. 29, 1970, Ser. No. 6,804

Claims priority, application Great Britain, Feb. 3, 1969, 5,715/69

Int. Cl. A44b *21/00*

U.S. Cl. 24—73

2 Sheets Drawing. 6 Pages Specification

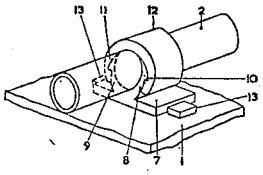

A clip is disclosed for attaching a thermoplastic panel to a metal frame used to reinforce the thermoplastic panel. The clip is preferably made of a stiff thermoplastic material and the base is shaped so as to engage sites integrally molded on the surface of the thermoplastic panel. Two arms extend above the base which receive and grip the metal frame or tubular member. Each arm carries a lug at or near its end. A transverse locking member is placed over the arms securing the tubular member between the arms.

Preferably the clip is slidably engaged with the thermoplastic panel to permit movement in transverse direction to the rod. Thermoplastic panels thus reinforced are useful for auto panels, for example, hoods, and enjoy the advantages of slidability to correct minor inaccuracies in automobile production and compensation for the thermal expansion of the tubular frame by sliding. Thermoplastic materials suitable for the production of clips are isotatic polymers of propylene, high density polyethylene, copolymers of propylene with ethylene, acrylonitrile-butadiene-styrene copolymers, acetal copolymers and nylons.

March 16, 1971 P. J. GARNER T884,011

CLIPS

Filed Jan. 29, 1970 2 Sheets-Sheet 1

INVENTOR
PAUL JOHNSON GARNER

BY
Cushman, Darby & Cushman
ATTORNEYS

March 16, 1971 P. J. GARNER T884,011

CLIPS

Filed Jan. 29, 1970 2 Sheets-Sheet 2

INVENTOR
PAUL JOHNSON GARNER

By
Cushman, Darby & Cushman
ATTORNEYS